United States Patent
Bender et al.

(10) Patent No.: US 11,070,638 B2
(45) Date of Patent: *Jul. 20, 2021

(54) IOT DEVICE IDENTIFICATION

(71) Applicant: International Business Machines Corporation, Armonk, NY (US)

(72) Inventors: Michael Bender, Rye Brook, NY (US); Rhonda Childress, Austin, TX (US); David Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 143 days.

This patent is subject to a terminal disclaimer.

(21) Appl. No.: 16/522,798

(22) Filed: Jul. 26, 2019

(65) Prior Publication Data

US 2019/0349443 A1    Nov. 14, 2019

Related U.S. Application Data

(63) Continuation of application No. 15/282,034, filed on Sep. 30, 2016, now Pat. No. 10,516,748.

(51) Int. Cl.
*H04L 29/08* (2006.01)
*G16Y 30/00* (2020.01)
*G16Y 30/10* (2020.01)

(52) U.S. Cl.
CPC .............. *H04L 67/24* (2013.01); *G16Y 30/00* (2020.01); *H04L 67/12* (2013.01); *G16Y 30/10* (2020.01)

(58) Field of Classification Search
CPC ......... H04L 67/24; H04L 67/12; G16Y 30/00; G16Y 30/10

(Continued)

(56) References Cited

U.S. PATENT DOCUMENTS 6,826,541 B1    11/2004    Johnston et al.
9,009,230 B1    4/2015    Matthieu et al.
(Continued)

FOREIGN PATENT DOCUMENTS

WO    2015052483 A1    4/2015
WO    2015193849 A1    12/2015

OTHER PUBLICATIONS

List of IBM Patents or Patent Applications Treated as Related, Aug. 25, 2019.

(Continued)

*Primary Examiner* — Zi Ye

(57) ABSTRACT

Providing an interested party with network availability of certain devices may provide a method including one or more of receiving user requirements for a user device, identifying IoT devices based on a degree of matching between manufacturer-defined capabilities of the IoT devices and the user requirements, verifying the manufacturer-defined capabilities based on tests that expose risks with the manufacturer-defined capabilities of the IoT devices in comparison to current operating features of the IoT devices, determining that no single IoT device satisfies the user requirements based on the verifying, identifying a group of IoT devices which meet or exceed the user requirements, and outputting information about the group of IoT devices including information about exposed risks with manufacturer-defined capabilities of the group of IoT devices via a user interface which enables selection and use of IoT devices included within the group of IoT devices.

20 Claims, 5 Drawing Sheets

(58) Field of Classification Search
USPC .......................................................... 709/220
See application file for complete search history.

(56) References Cited

U.S. PATENT DOCUMENTS

| 10,516,748 B2* | 12/2019 | Bender ................... H04L 67/24 |
| 2002/0077931 A1 | 6/2002 | Henrion et al. |
| 2005/0108094 A1* | 5/2005 | Hugron .............. G06Q 30/0203 |
| | | 705/14.44 |
| 2015/0006695 A1 | 1/2015 | Gupta |
| 2016/0301707 A1* | 10/2016 | Cheng ................... H04L 67/303 |

OTHER PUBLICATIONS

M. Bender et al. "IoT Device Identification", U.S. Appl. No. 15/282,034, filed Sep. 30, 2016 ( a copy is not provided as this application is available to the Examiner).

Boutin, "Crowdsourcing: Consumers and Creators", Jul. 13, 2006, www.bloomberg.com, https://www.bloomberg.com/news/articles/2006-07-12/crowdsourcing-consumers-as-creators.

Gheorghe, "How to Choose the Safest IoT Device for your Home", Jun. 2, 2016, www.macworld.com, https://www.macworld.com/article/3078514/Internet-of-things/how-to-choose-the-safest-iot-device-for-your-home.html.

Moran, "How to Best Use Crowdsourcing", Nov. 23, 2010, www.entrepreneur.com, https://www.entrepreneur.com/article/217550.

Neto, "Sensing in the Collaborative Internet of Things", Mar. 19, 2015, https://www.ncbi.nlm.nih.gov/pmc/articles/PMC4435129/pdf/sensors-15-06607.pdf.

Riley, "Functional Testing for IoT", Feb. 14, 2015, devops.com, https://devops.com/functional-testing-iot/.

Zeigler, "Researching crowdsourcing to extend IoT tested infrastructure", Oct. 1, 2013, www.iotlab.eu, http://www.iotlab.eu/Content/images/IoTLab-D9.1.pdf.

* cited by examiner

300

350

IOT DEVICE IDENTIFICATION

TECHNICAL FIELD

This application relates to selecting certain devices based on user requirements and more specifically to identifying Internet of Things (IoT) devices based on factors such as a prioritization scheme and user requirements.

BACKGROUND

Conventionally, Internet of Things (IoT) compatible devices operating on a network may offer services and functionality which can be customized and embraced by user preferences. As IoT devices continue to grow in popularity, their functions may not be fully utilized.

One conventional approach may include a way of registering Internet devices that interact with each other. For example, capabilities of an electronic software/networking stack may be associated with an IoT device, including the initialization of a multi-role module, registering a resource value in the module and tracking such roles in a central management system. Such a configuration provides a way to limit the functional capabilities of a device by providing instructions on how to decide which device input to use.

Another conventional approach may include a way of identifying devices on a network for the purpose of communicating with other devices. However, this approach fails to address customization and preferences being identified prior to any type of IoT device initiation or execution.

SUMMARY

One example embodiment may include a method that comprises one or more of receiving user requirements for a user device of an Internet of Things (IoT) network, identifying IoT devices operating on the IoT network based on a degree of matching between manufacturer-defined capabilities of the IoT devices and the user requirements, verifying, via the IoT network, the manufacturer-defined capabilities of the identified IoT devices based on tests that expose risks with the manufacturer-defined capabilities of the IoT devices in comparison to current operating features of the IoT devices, determining, via the IoT network, that no single IoT device from among the identified IoT devices satisfies the user requirements based on the verifying, identifying a group of IoT devices from among the verified IoT devices which meet or exceed the user requirements, and outputting information about the group of IoT devices including information about exposed risks with manufacturer-defined capabilities of the group of IoT devices via a user interface which enables selection and use of IoT devices included within the group of IoT devices.

The user requirements may include a plurality of operational requirements for Internet of Things (IoT) compatible devices. The plurality of operational requirements for the IoT compatible devices may include security functions and/or operational functions. An advantage of pairing user requirements with IoT devices may include providing a user with a most optimal device that is available to satisfy the user requirements. The tests on the devices may be performed by crowdsourcing which provides the advantage of having users of one or more of the devices provide feedback regarding the types of services the devices provide, whether those services and devices work properly and which ones are more optimal than others.

The method may also include providing the optimal device selection among the prioritized list of devices by providing one or more of a most optimal device selection, one or more user requirements which are not satisfied by the most optimal device selection, and one or more risks associated with the most optimal device selection. Publishing a list of risks associated with the devices based on the user requirements may provide a user with a report of which devices should not be considered (or conversely, which should), which user desired features were not found or paired with the devices and which risks or limitations may be present if the devices are utilized.

Additional features may include weighting the prioritized list of devices based on the user requirements, selecting a group of devices in the prioritized list which perform the user requirements, and providing the group of devices as the optimal device selection. An advantage of weighting the prioritized list of devices includes demonstrating a degree of relevance for each device.

Another example embodiment may include an apparatus that comprises a processor configured to perform one or more of a processor configured to one or more of receive user requirements for a user device of an Internet of Things (IoT) network, identify IoT devices that operate on the IoT network based on a degree of matching between manufacturer-defined capabilities of the IoT devices and the user requirements, test, via the IoT network, the manufacturer-defined capabilities of the identified IoT devices based on tests that expose risks with the manufacturer-defined capabilities of the IoT devices in comparison to current operating features of the IoT devices, determine, via the IoT network, that no single IoT device from among the identified IoT devices satisfies the user requirements based on the verifying, and identify a group of IoT devices from among the verified IoT devices which meet or exceed the user requirements, and a transmitter configured to output information about the group of IoT devices including information about exposed risks with manufacturer-defined capabilities of the group of IoT devices via a user interface which enables selection and use of tested IoT devices included within the group of tested IoT devices.

A further example embodiment comprises non-transitory computer readable storage medium configured to store instructions that when executed cause a processor to perform one or more of receiving user requirements for a user device of an Internet of Things (IoT) network, identifying IoT devices operating on the IoT network based on a degree of matching between manufacturer-defined capabilities of the IoT devices and the user requirements, verifying, via the IoT network, the predetermined capabilities of the identified IoT devices based on tests that expose risks with the manufacturer-defined capabilities of the IoT devices in comparison to current operating features of the IoT devices, determining, via the IoT network, that no single IoT device from among the identified IoT devices satisfies the user requirements based on the verifying, identifying a group of IoT devices from among the verified IoT devices which meet or exceed the user requirements, and outputting information about the group of IoT devices including information about risks with manufacturer-defined capabilities of the group of IoT devices via a user interface which enables selection and use of IoT devices included within the group of IoT devices.

DETAILED DESCRIPTION

Figure 1:
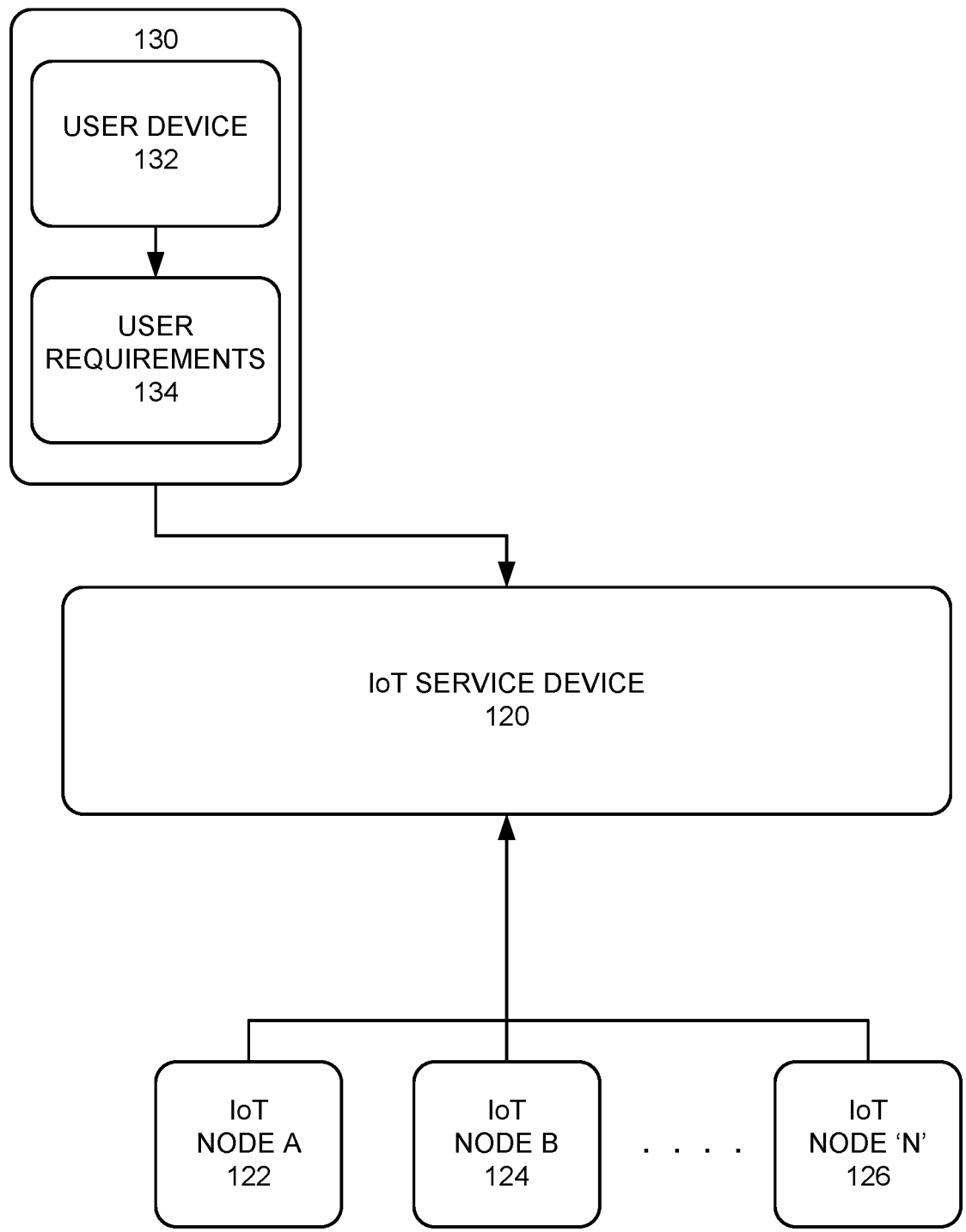
FIG. 1 illustrates a logic block diagram of an IoT device configuration according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

One embodiment of the present application provides a central service that permits a consumer to select features of an IoT device that are most important to the user, for example based on functionality and/or price and present the best option(s) to a user device for viewing, selection and/or purchase by the user. The options may include a device or devices to be used based on requirements established by the user which are stored in memory and retrieved and used as a basis to perform comparisons of the IoT devices prior to presentation.

Example embodiments provide an application and/or software, method, apparatus and non-transitory computer readable medium which support a testing and confirmation system to assist interested parties, such as users, vendors, etc., with an accurate list of available IoT devices, resources, etc. For example, a list of characteristics of IoT device(s) can be created and shared with any interested party. The devices may be identified and tested to ensure the information associated with the device (such as specifications, functionality, price, availability, etc.) is correct. Users of the service can select features they consider important and an order or weight of such features, such as security and implementation. The system will return a weighted list of devices that meet the requirements or which are the closest to the fulfilling the requirements. A user may also use and/or register a device once the device has been chosen, obtained, rented or purchased. If any vulnerabilities are later detected in a used IoT device, the instant application can inform the user, via a user's device, of the vulnerability, an update to fix the vulnerability, etc. Based on the vulnerability, the instant application can assign a risk rating of probability vs. impact. A user of a user device can then make an informed decision to continue to use the IoT device until the update is available or discontinue using the device.

It would be beneficial to include features that are identified and desired prior to entering a device into a network based on features that are deemed to be important. Also, using available information to identify possible risks for a device and possible remediation to those risks may be beneficial. Additionally, monitoring the registered devices to provide additional input during the active life of the IoT device would be advantageous.

It would be helpful to monitor the registered devices to provide additional input during the active life of the IoT device. Also, verifying claims made by a manufacturer about the capabilities of a device and providing a communication mechanism to notify users of potential issues and the risks of those issues would be advantageous.

FIG. 1 illustrates a system 100 configured to provide IoT device configuration according to example embodiments. Referring to FIG. 1, a user device 132 and user requirements 134 may be part of or communicably coupled to a user device service or structure 130 which includes a user profile, memory and a communication platform for communicating with a centralized IoT service device(s) 120. Such communication may include receiving updates and other information from the IoT service device 120 and providing information from the structure 130 to the service device. In other embodiments, the functionality and elements described herein can all be contained in or performed by the user device 132. The requirement information is received via a per user or per profile basis and used to organize IoT device related information (such as availability, functionality, etc.). For example, the IoT nodes or devices A 122, B 124 . . . N 126 may be any type of device providing any type of service.

In one example embodiment, a service will permit a user to find IoT devices that meet the user's requirements for the functionality of the IoT device(s). Recommendations of an IoT device (which can be weighted and based on functionality, security and/or other factors) may be performed by a centralized service, which can provide a list of devices that fit the users' requirements. Since the pool of available IoT devices and resources is likely to yield a less than perfect requirement match, a prioritized list of devices that best fit the user's requirements may be provided. Makers of IoT devices may provide input to the service regarding the features and other attributes of their IoT devices (including what are considered non-functional requirements) and/or the service or service device 120 can receive or request this information from any source (such as one or more web sites or applications). This embodiment provides an advantage that all available devices on the IoT network may be reduced to a list which is suitable for a particular user profile, user preferences and/or user requirements.

An embodiment in which the list of prioritized devices is weighted and includes user requirements which are not found in any of the devices listed has the advantage of providing a list of requirements which were not found (or partially found) in any of the available devices. The user can then decide whether the available IoT devices are enough to satisfy the user's requirements or whether another search should be performed.

In operation, a user can select various bundles of desirable features or individual features or a combination of both by establishing a priority of features, for example. Crowdsourcing, as a way of testing, may occur to determine a veracity of the features. A determination may be made by computing a closest fit for the desirable features in a ranked order and providing a set of missing features and any risks that there may be based on the missing features. The IoT device that a user of the system is registered with may provide the user with an ability to receive updates (via an opt-in for example) on any issues with the IoT device and any new releases of firmware/software. In the event of a change, notifying a user of the system of any issues (e.g. vulnerabilities) with the IoT device and any available updates may also be performed. A user can register their IoT device make, model, where the purchase was made and any firmware/software levels, as well as any other information associated with the device, with the service device 120. The service may scan the Internet identifying reported issues on the IoT devices which are available. The service will compute a risk rating based on the reported issue by computing a probability vs impact score. The service may scan the vendor information to identify new firmware/software updates for the IoT devices registered in the system. The service can notify a registered user of the service if there are any reported/verified issues or firmware/software.

Figure 2:
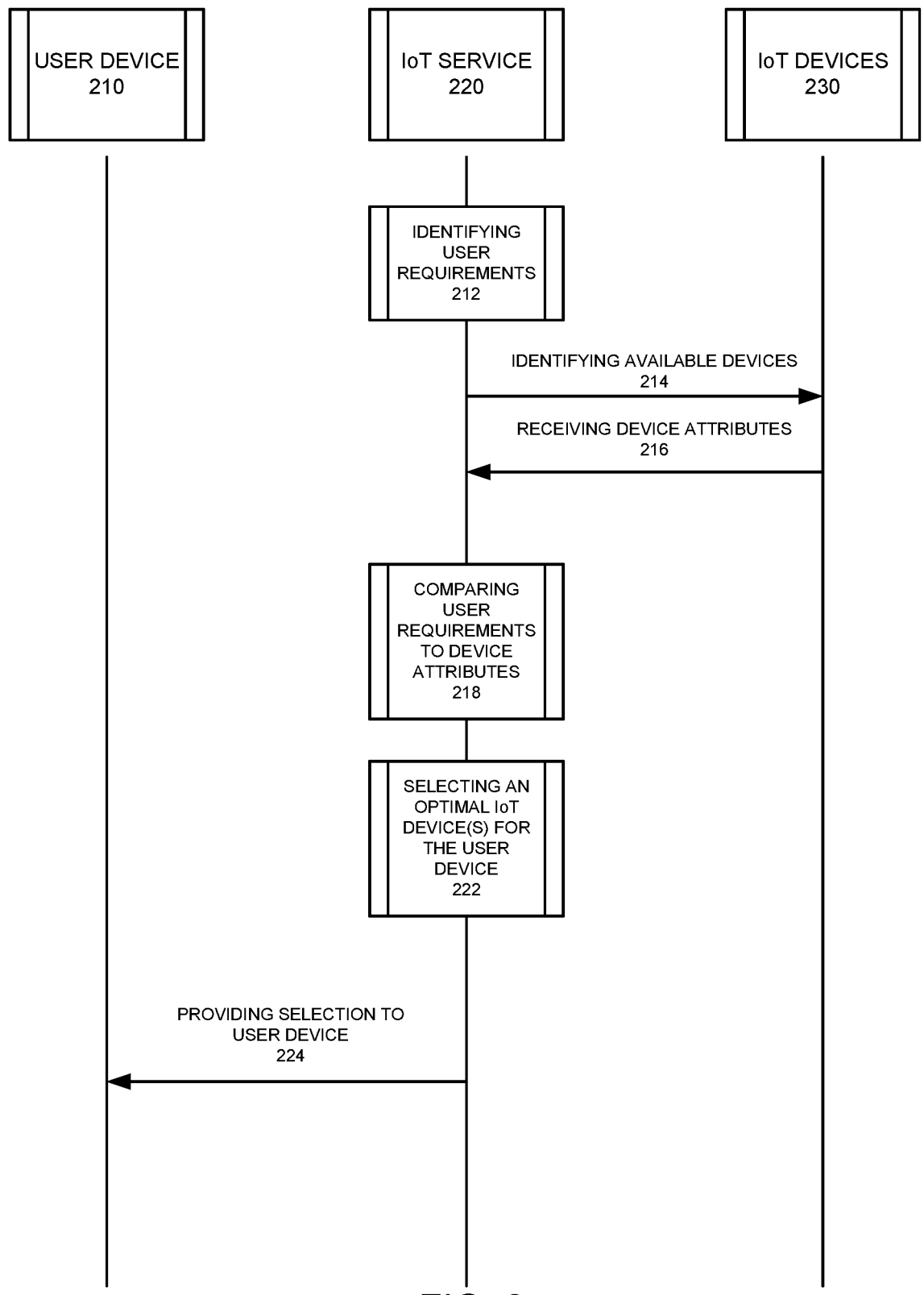
FIG. 2 illustrates a system signaling diagram of a IoT device selection and compliance configuration according to example embodiments.

FIG. 2 illustrates a system signaling diagram of a IoT device selection and compliance configuration according to example embodiments. Referring to FIG. 2, the system includes at least three devices including but not limited to a user device 210, an IoT service device 220 and the available and known IoT devices 230. In operation, the user device 210 may submit a query or have a set of recurring requirements which are viewed and checked continuously for updates to the network of IoT devices 230. The requirements 212 are received and processed at the service device and then availability of devices 214 can be requested and received 216. The known services, attributes (i.e., device type, device compatibility, device services, software/hardware requirements, etc.) of each device are then compared to the user device submitted requirements 218. The ranking order of prioritization may be listed based on devices, device attributes, weighted sums, etc. The most relevant devices may be scored and ranked in an optimal order 222. The list of results can be shared with the user device 210 to establish an order of device relevancy 224.

Figure 3A:
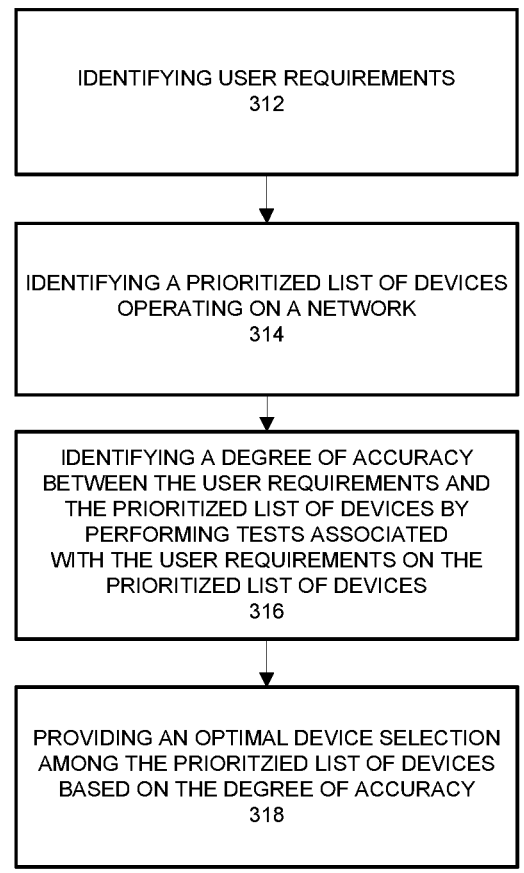
FIG. 3A illustrates a flow diagram of an example method of operation according to example embodiments.

FIG. 3A illustrates a flow diagram of an example method of operation according to example embodiments. Referring to FIG. 3, the method 300 may include one or more of identifying user requirements 312, identifying a prioritized list of devices operating on a network 314, identifying a degree of accuracy between the user requirements and the prioritized list of devices by performing tests associated with the user requirements on the prioritized list of devices 316, and providing an optimal device selection among the prioritized list of devices based on the degree of accuracy 318. The user requirements can include a plurality of operational requirements for IoT compatible devices and the plurality of operational requirements for the IoT compatible devices may include security functions. The tests may be performed by crowdsourcing (via the Internet, for example) to receive feedback. The method may also include providing the optimal device selection among the prioritized list of devices by providing a most optimal device selection, one or more user requirements which are not satisfied by the most optimal device selection, and one or more risks associated with the most optimal device selection. The method may also include weighting the prioritized list of devices based on the user requirements. Each device may be assigned a weight that corresponds with the degree of accuracy the device satisfies the user requirements. Also, instead of having a single device be assigned to a user or having one most optimal device, a group of devices may be assigned which met or exceed the user requirements, and those devices may be provided as the most optimal device selection.

Figure 3B:
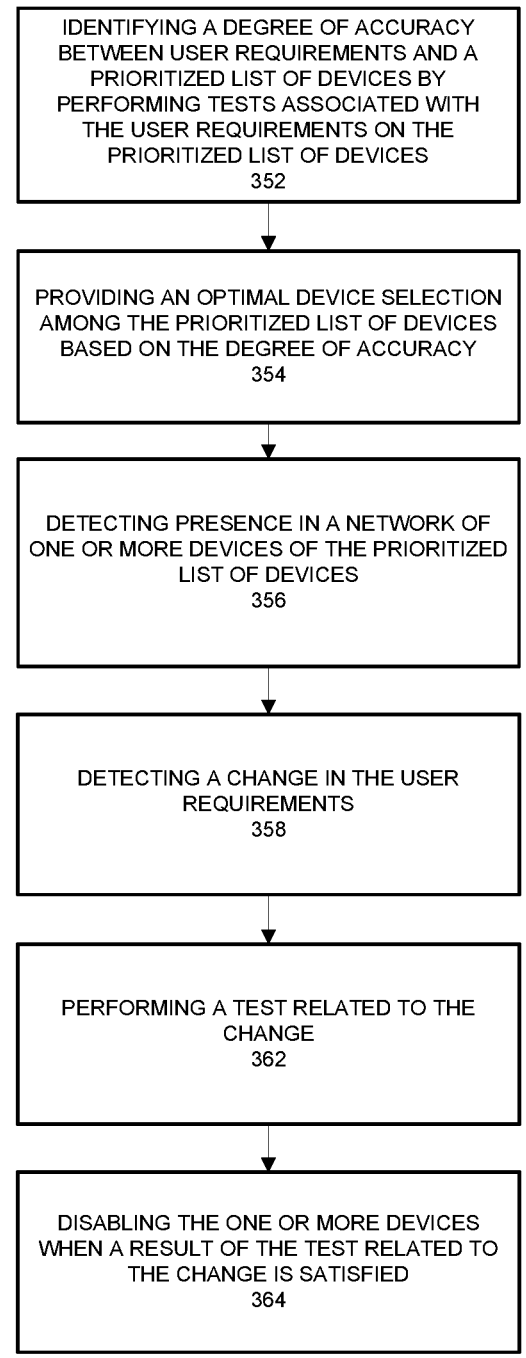
FIG. 3B illustrates a flow diagram of another example method of operation according to example embodiments.

FIG. 3B illustrates a flow diagram of another example method of operation according to example embodiments. Referring to FI 358G. 3B, the method 350 may include one or more of identifying a degree of accuracy between user requirements and a prioritized list of devices by performing tests associated with the user requirements on the prioritized list of devices 352, providing an optimal device selection among the prioritized list of devices based on the degree of accuracy 354, detecting presence in a network of at least one device of the prioritized list of devices 356, detecting a change in the user requirements 358, performing a test related to the change 362 and disabling the device when a result of the test related to the change is met 364. Makers of IoT devices can provide input to the service regarding the features of their IoT devices, including non-functional requirements. Subject Matter Experts or SME's can set a bundle (grouping) of desirable features for specific type of IoT devices, for example, security features. A user can select various bundles of desirable features or individual features or a combination of both by priority of features. If a user's requirements change, the device(s) the user is currently using may be disabled by the service device 120, or partially disabled. Further, an alternate device(s) may be recommended to the user based on the changed requirements.

According to another example, a system, component, method, and non-transitory computer readable medium may provide a mechanism to notify a user of a system (such as the IoT service device 120) of any issues (e.g. vulnerabilities) with the IoT device and any available updates which permit a user to receive this information (based on one or more of a registered device, a device make, model, where purchased, and/or firmware/software levels). The service can continuously scan the Internet looking for reported issues on the IoT devices being monitored and can report those issues and/or compute a risk rating based on the reported issue by computing a score (based on probability, impact, cost, etc.). The service can also continuously scan vendor or manufacturer information looking for new firmware/software updates for the IoT devices stored in its system. The service will notify a user of the service if there are any reported/verified issues.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
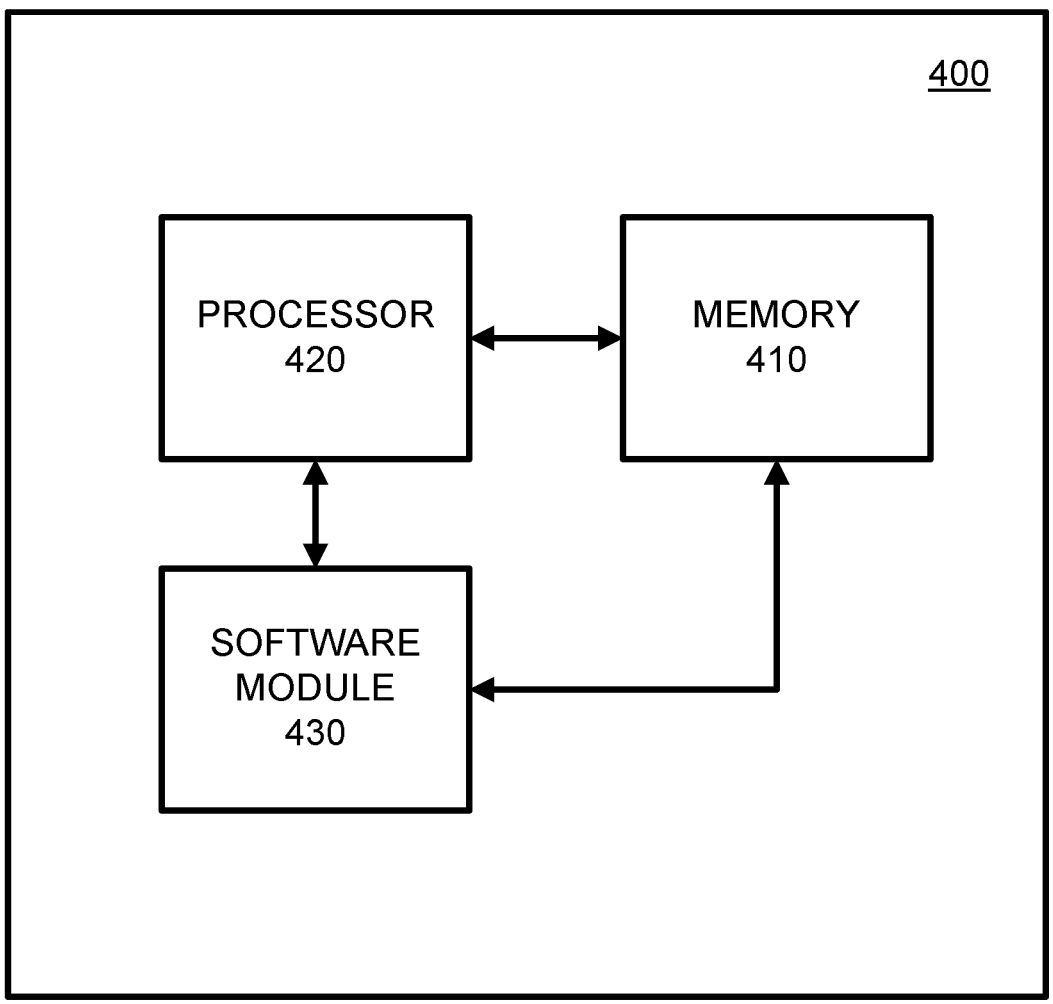
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    receiving user requirements for a user device of an Internet of Things (IoT) network, the user requirements comprising functional capabilities;
    determining that no single IoT device operating on the IoT network satisfies the user requirements for functionality;
    assigning respective values to the IoT devices based on a degree of accuracy that the IoT devices satisfy the functional capabilities included in the user requirements;

identifying a group of IoT devices from among the IoT devices which meet or exceed the user requirements for functionality based on the assigned respective values; and outputting information about the group of IoT devices including information about exposed risks with manufacturer-defined capabilities of the group of IoT devices via a user interface which enables selection and use of IoT devices included within the group of IoT devices.

2. The method of claim 1, wherein the user requirements comprise a plurality of live operational requirements for the IoT devices.

3. The method of claim 2, wherein the plurality of live operational requirements for the IoT devices comprise security functions.

4. The method of claim 1, further comprising identifying IoT devices operating on the IoT network based on a degree of matching between manufacturer-defined capabilities of the IoT devices and the functional capabilities included in the user requirements.

5. The method of claim 1, wherein the outputting comprises displaying a most suitable IoT device selection among the group of IoT devices, functional capabilities included in the user requirements which are not satisfied by the most suitable IoT device selection, and risks exposed by testing of the most suitable IoT device selection.

6. The method of claim 1, wherein, in response to none of the IoT devices being determined to fully satisfy a functional capability included in the user requirements, the outputting comprises outputting an identification of an IoT device that most nearly satisfies the functional capability in the user requirements and a security risk associated with the respective IoT device.

7. The method of claim 1, further comprising verifying, via the IoT network, the manufacturer-defined capabilities of the identified IoT devices based on tests of the manufacturer-defined capabilities of the IoT devices in comparison to current operating features of the IoT devices.

8. The method of claim 1, further comprising in response to detecting a change in the user requirement, disabling one or more of the IoT devices currently being used by the user device.

9. The method of claim 1, wherein the functional capabilities comprise types of services, and the values are assigned based on an accuracy that manufacturer-defined services perform the types of services.

10. An apparatus, comprising:
a processor configured to
receive user requirements for a user device of an Internet of Things (IoT) network, the user requirements comprising functional capabilities;
determine that no single IoT device that operates on the IoT network satisfies the user requirements for functionality;
assign respective values to the IoT devices based on a degree of accuracy that the IoT devices satisfy the functional capabilities included in the user requirements;
identify a group of IoT devices from among the IoT devices which meet or exceed the user requirements for functionality based on the assigned respective values; and
output information about the group of IoT devices including information about exposed risks with manufacturer-defined capabilities of the group of IoT devices via a user interface which enables selection and use of IoT devices included within the group of IoT devices.

11. The apparatus of claim 10, wherein the user requirements comprise a plurality of live operational requirements for the identified IoT devices.

12. The apparatus of claim 11, wherein the plurality of operational requirements for the identified IoT devices comprise security functions.

13. The apparatus of claim 10, wherein the processor is configured to identify IoT devices that operates on the IoT network based on a matched degree between manufacturer-defined capabilities of the IoT devices and the functional capabilities included in the user requirements.

14. The apparatus of claim 10, comprising a transmitter configured to output a display of a most suitable IoT device selection among the group of IoT devices, one or more functional capabilities included in the user requirements which are not satisfied by the most suitable IoT device selection, and one or more risks exposed by a test of the most suitable IoT device selection.

15. A non-transitory computer readable storage medium configured to store instructions that when executed cause a processor to perform:
receiving user requirements for a user device of an Internet of Things (IoT) network, the user requirements comprising functional capabilities;
determining that no single IoT device operating on the IoT network satisfies the user requirements for functionality;
assigning respective values to the IoT devices based on a degree of accuracy that the IoT devices satisfy the functional capabilities included in the user requirements;
identifying a group of IoT devices from among the IoT devices which meet or exceed the user requirements for functionality based on the assigned respective values; and
outputting information about the group of IoT devices including information about exposed risks with manufacturer-defined capabilities of the group of IoT devices via a user interface which enables selection and use of IoT devices included within the group of IoT devices.

16. The non-transitory computer readable storage medium of claim 15, wherein the user requirements comprise a plurality of live operational requirements for the identified IoT devices.

17. The non-transitory computer readable storage medium of claim 15, wherein the plurality of live operational requirements comprise security functions.

18. The non-transitory computer readable storage medium of claim 15, comprising instructions that when executed cause the processor to perform identifying IoT devices operating on the IoT network based on a degree of matching between manufacturer-defined capabilities of the IoT devices and the functional capabilities included in the user requirements.

19. The non-transitory computer readable storage medium of claim 15, wherein the outputting comprises outputting a most suitable IoT device selection among the group of IoT devices, one or more functional capabilities included in the user requirements which are not satisfied by the most suitable IoT device selection, and one or more risks exposed by testing of the most suitable IoT device selection.

20. The non-transitory computer readable storage medium of claim 15, wherein, in response to none of the IoT devices being determined to fully satisfy a functional capability included in the user requirements, the outputting comprises outputting an identification of an IoT device that most nearly satisfies the functional capability in the user requirements and a security risk associated with the respective IoT device.

\* \* \* \* \*